United States Patent
Wu et al.

(10) Patent No.: US 12,368,553 B2
(45) Date of Patent: *Jul. 22, 2025

(54) SIDELINK POSITIONING REFERENCE SIGNAL INDICATION AND ASSOCIATED RESOURCE GRANT

(71) Applicant: QUALCOMM Incorporated, San Diego, CA (US)

(72) Inventors: Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,292

(22) Filed: Jan. 17, 2024

(65) Prior Publication Data

US 2024/0154751 A1    May 9, 2024

Related U.S. Application Data

(63) Continuation of application No. 17/482,108, filed on Sep. 22, 2021, now Pat. No. 11,916,825.

(51) Int. Cl.
*H04L 5/00* (2006.01)
*H04W 4/029* (2018.01)
*H04W 72/21* (2023.01)

(52) U.S. Cl.
CPC ........... *H04L 5/0048* (2013.01); *H04W 4/029* (2018.02); *H04W 72/21* (2023.01)

(58) Field of Classification Search
None
See application file for complete search history.

(56) References Cited

U.S. PATENT DOCUMENTS 11,916,825 B2 *   2/2024   Wu ................... H04W 4/80
2017/0127251 A1 * 5/2017   Yi .................... H04W 76/14
(Continued)

FOREIGN PATENT DOCUMENTS

EP    4060923 A1   9/2022
EP    4072195 A1   10/2022
(Continued)

OTHER PUBLICATIONS

CATT: "Discussion of NR Positioning Enhancements", 3GPP TSG RAN WG1 Meeting #101, R1-2003642, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, 18 Pages, May 16, 2020 (May 16, 2020), XP051885417, Sections 3.1.1, 3.1.3, Figures 5, 6.

(Continued)

*Primary Examiner* — Hassan A Phillips
*Assistant Examiner* — Gautam Sharma
(74) *Attorney, Agent, or Firm* — Thien T. Nguyen

(57) ABSTRACT

Disclosed are techniques for wireless communication. In an aspect, a UE transmits, to a base station, a sidelink positioning reference signal (PRS) indication. The base station transmits, to the UE, a resource grant associated with communication of at least a sidelink PRS for transmission by the UE for a sidelink position estimation procedure. The UE transmits the first sidelink PRS in accordance with the resource grant.

46 Claims, 13 Drawing Sheets

(56) References Cited

U.S. PATENT DOCUMENTS

| | | | |
|---|---|---|---|
| 2019/0007923 A1* | 1/2019 | Blankenship | H04L 5/0073 |
| 2019/0230618 A1* | 7/2019 | Saur | H04W 56/001 |
| 2019/0306923 A1* | 10/2019 | Xiong | H04J 13/0062 |
| 2020/0163005 A1* | 5/2020 | Rao | H04W 4/44 |
| 2022/0116169 A1* | 4/2022 | Stare | H04L 5/0048 |
| 2023/0086568 A1 | 3/2023 | Wu et al. | |
| 2023/0188259 A1* | 6/2023 | Liu | H04L 1/08 |
| | | | 370/329 |
| 2023/0188964 A1* | 6/2023 | Pateromichelakis | H04L 67/34 |
| | | | 709/218 |
| 2023/0309066 A1* | 9/2023 | Ganesan | H04W 72/02 |
| 2023/0393254 A1* | 12/2023 | Goyal | G01S 7/003 |
| 2024/0137899 A1* | 4/2024 | Thomas | H04W 64/00 |
| 2024/0154751 A1* | 5/2024 | Wu | H04W 72/21 |

FOREIGN PATENT DOCUMENTS

| | | |
|---|---|---|
| WO | 2021112610 A1 | 6/2021 |
| WO | 2021133104 A1 | 7/2021 |

OTHER PUBLICATIONS

International Search Report and Written Opinion—PCT/US2022/074517—ISA/EPO—Nov. 14, 2022.

\* cited by examiner

SIDELINK POSITIONING REFERENCE SIGNAL INDICATION AND ASSOCIATED RESOURCE GRANT

CROSS-REFERENCE TO RELATED APPLICATIONS

The present Application for Patent is a Continuation of U.S. Non-Provisional application Ser. No. 17/482,108, entitled "SIDELINK POSITIONING REFERENCE SIGNAL INDICATION AND ASSOCIATED RESOURCE GRANT," filed Sep. 22, 2021, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes transmitting, to a base station, a sidelink positioning reference signal (PRS) indication; receiving, from the base station, a resource grant associated with communication of at least a first sidelink PRS for a sidelink position estimation procedure; and transmitting the first sidelink PRS in accordance with the resource grant.

In an aspect, a method of operating a base station includes receiving, from a user equipment (UE), a sidelink positioning reference signal (PRS) indication; and transmitting, to the UE, a resource grant associated with communication of at least a first sidelink PRS for transmission by the UE for a sidelink position estimation procedure.

In an aspect, a user equipment (UE) includes a memory; at least one transceiver; and at least one processor communicatively coupled to the memory and the at least one transceiver, the at least one processor configured to: transmit, via the at least one transceiver, to a base station, a sidelink positioning reference signal (PRS) indication; receive, via the at least one transceiver, from the base station, a resource grant associated with communication of at least a first sidelink PRS for a sidelink position estimation procedure; and transmit, via the at least one transceiver, the first sidelink PRS in accordance with the resource grant.

In an aspect, a base station includes a memory; at least one transceiver; and at least one processor communicatively coupled to the memory and the at least one transceiver, the at least one processor configured to: receive, via the at least one transceiver, from a user equipment (UE), a sidelink positioning reference signal (PRS) indication; and transmit, via the at least one transceiver, to the UE, a resource grant associated with communication of at least a first sidelink PRS for transmission by the UE for a sidelink position estimation procedure.

In an aspect, a user equipment (UE) includes means for transmitting, to a base station, a sidelink positioning reference signal (PRS) indication; means for receiving, from the base station, a resource grant associated with communication of at least a first sidelink PRS for a sidelink position estimation procedure; and means for transmitting the first sidelink PRS in accordance with the resource grant.

In an aspect, a base station includes means for receiving, from a user equipment (UE), a sidelink positioning reference signal (PRS) indication; and means for transmitting, to the UE, a resource grant associated with communication of at least a first sidelink PRS for transmission by the UE for a sidelink position estimation procedure.

In an aspect, a non-transitory computer-readable medium storing computer-executable instructions that, when executed by a user equipment (UE), cause the UE to: transmit, to a base station, a sidelink positioning reference signal (PRS) indication; receive, from the base station, a resource grant associated with communication of at least a first sidelink PRS for a sidelink position estimation procedure; and transmit the first sidelink PRS in accordance with the resource grant.

In an aspect, a non-transitory computer-readable medium storing computer-executable instructions that, when executed by a base station, cause the base station to: receive, from a user equipment (UE), a sidelink positioning reference signal (PRS) indication; and transmit, to the UE, a resource grant associated with communication of at least a first sidelink PRS for transmission by the UE for a sidelink position estimation procedure.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
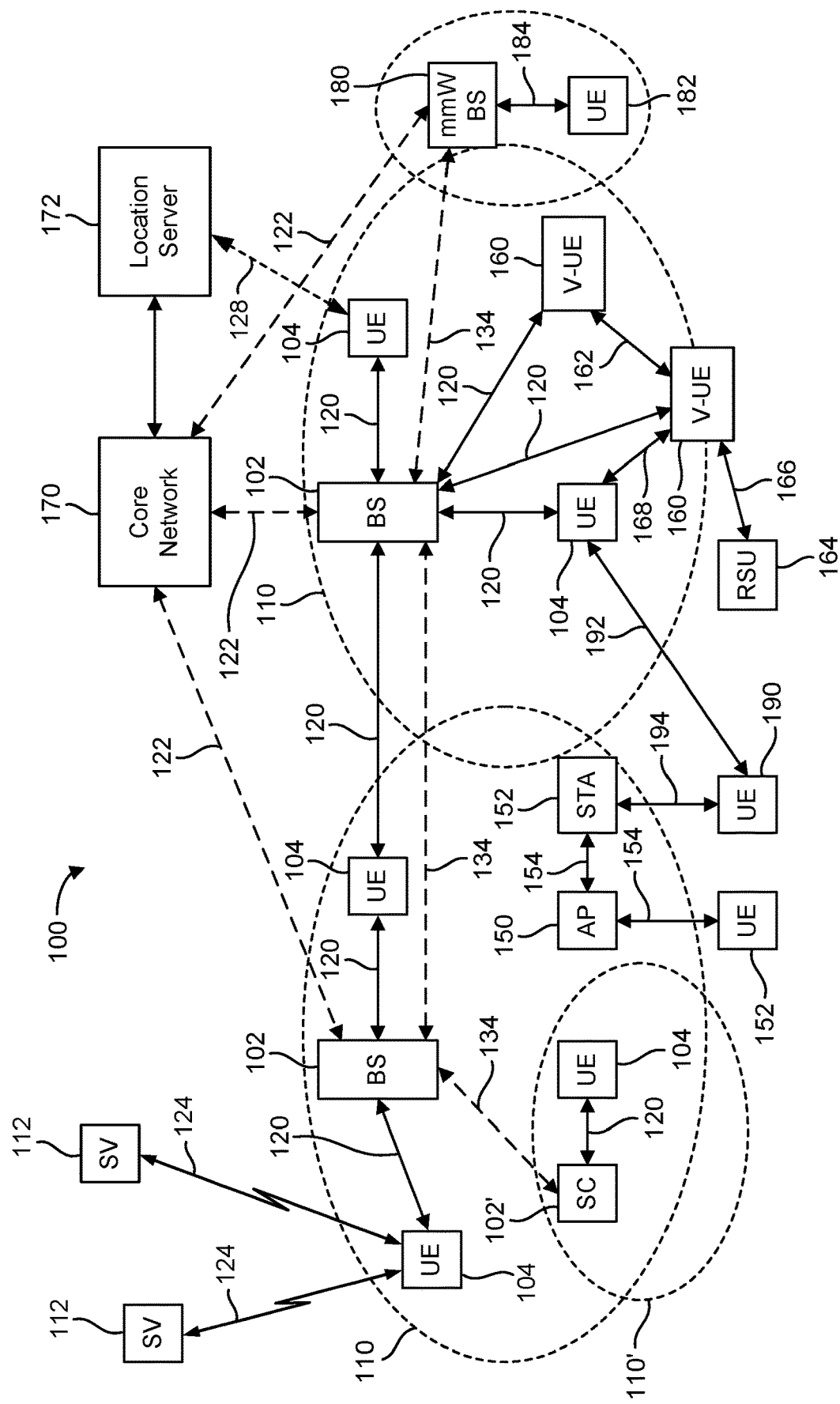
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
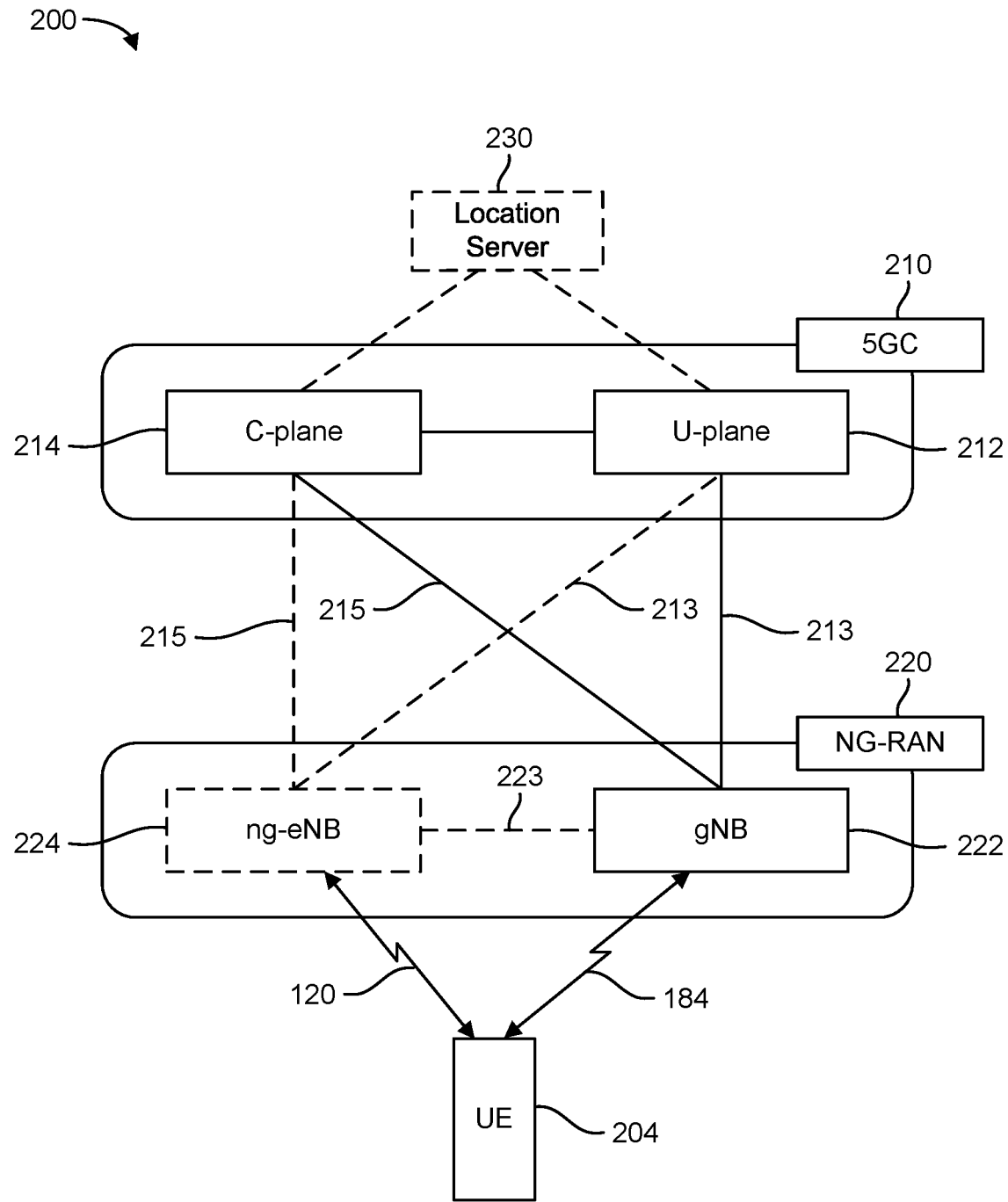
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
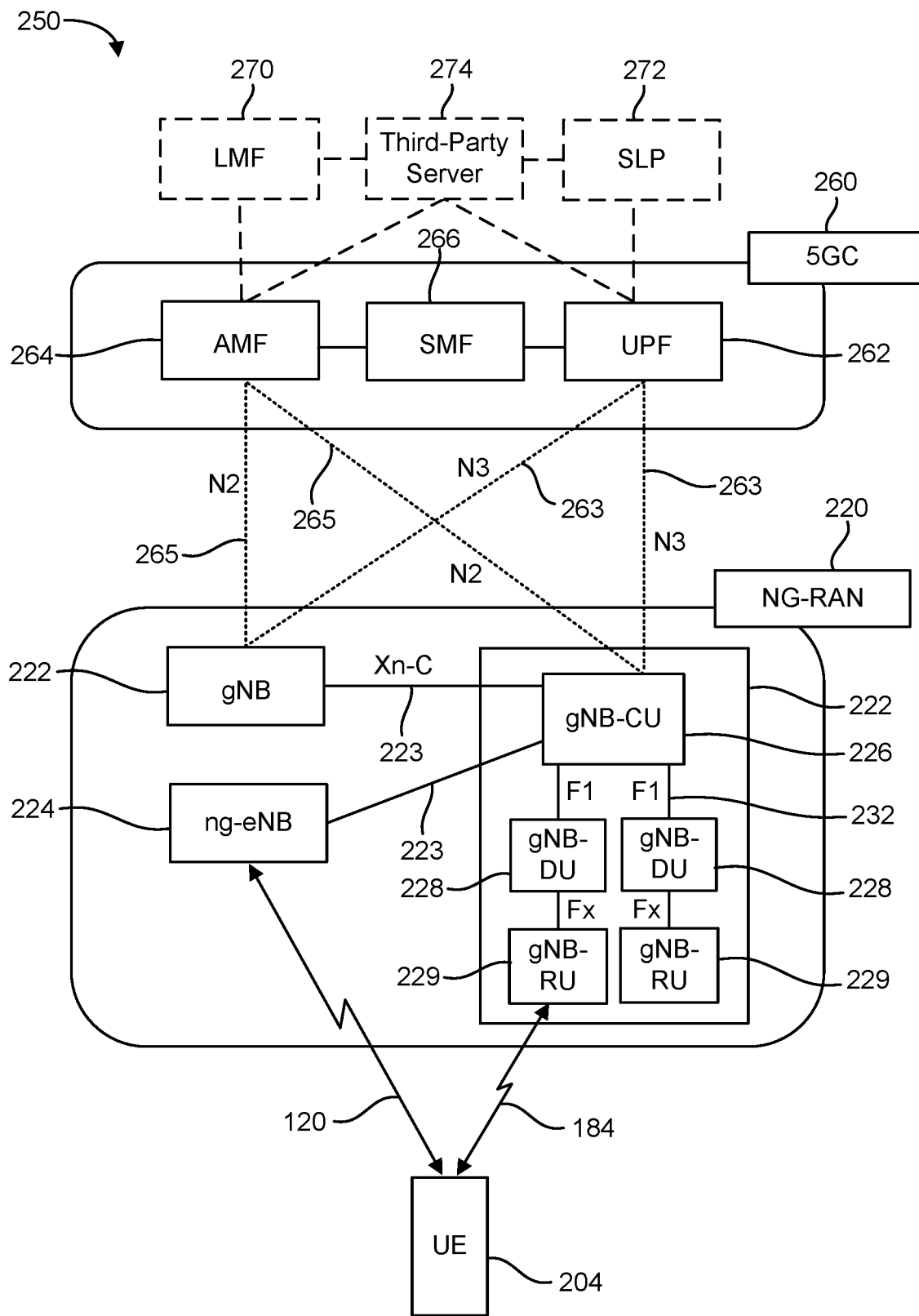

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
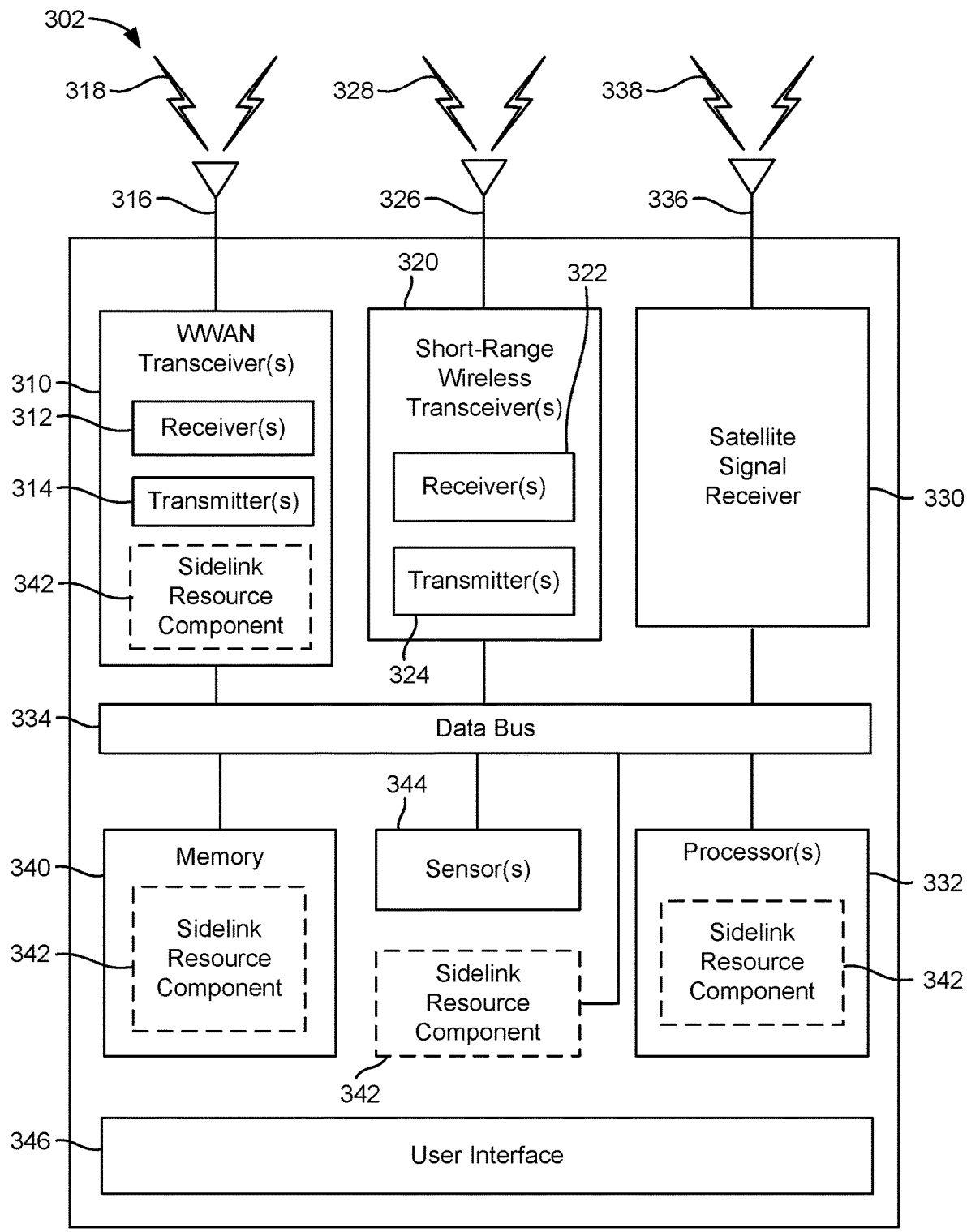
FIGS. 3A, 3B, and 3C are simplified block diagrams of several sample aspects of components that may be employed in a user equipment (UE), a base station, and a network entity, respectively, and configured to support communications as taught herein.
Figure 3B:
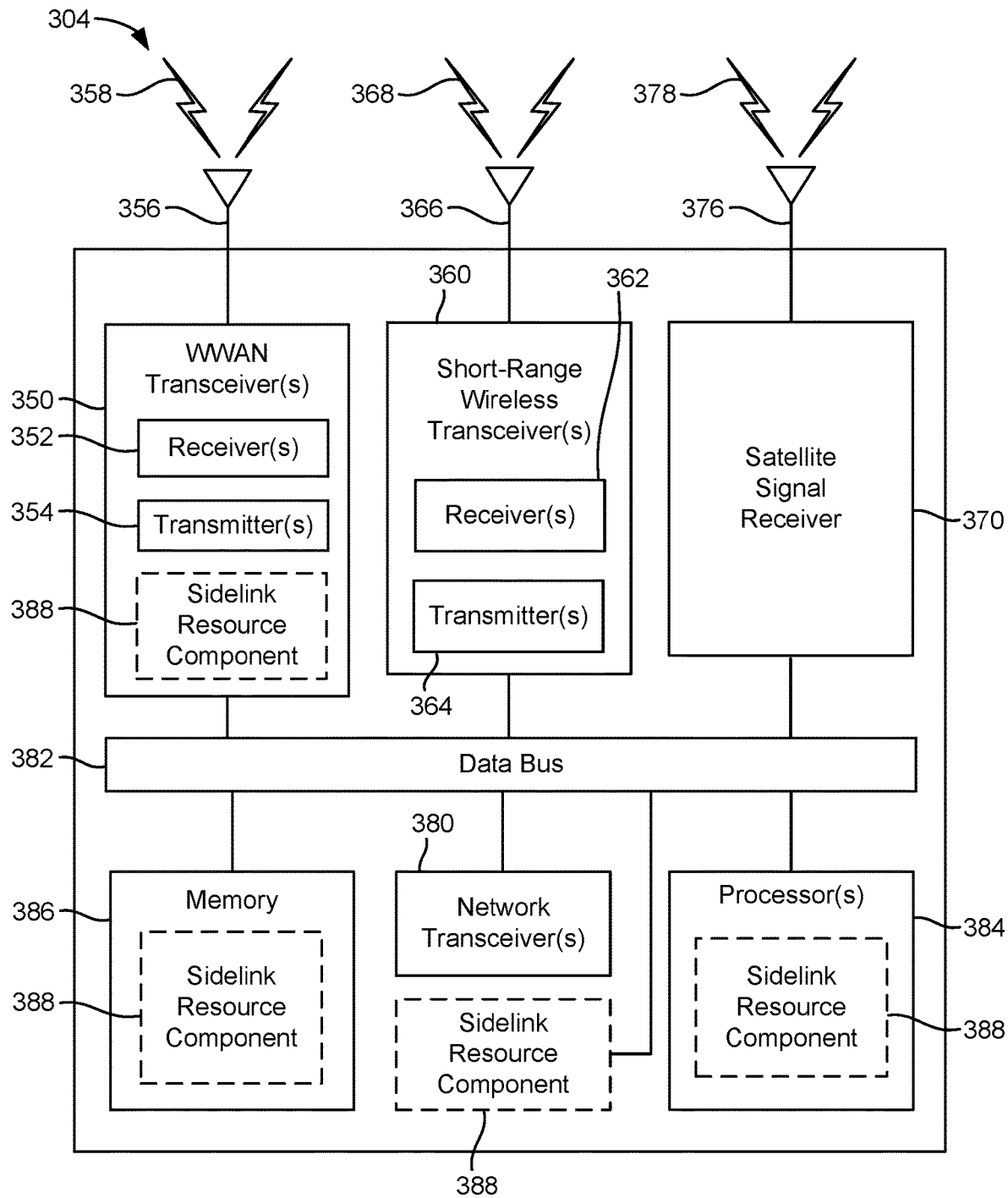
Figure 3C:
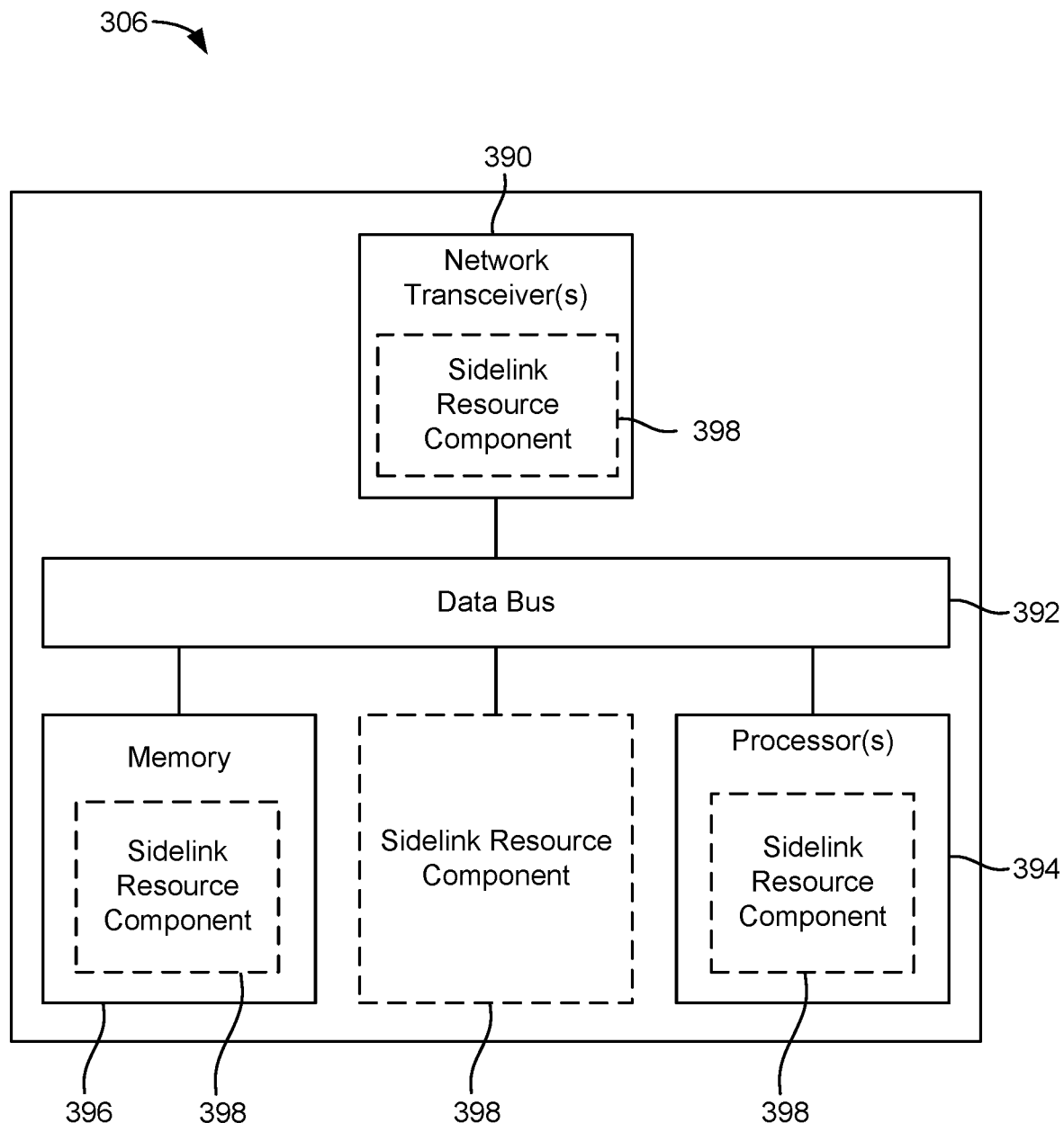

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sidelink resource component 342, 388, and 398, respectively. The sidelink resource component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sidelink resource component 342, 388, and 398 may be external to the processors 332, 384, and 394 (e.g., part of a modem processing system, integrated with another processing system, etc.). Alternatively, the sidelink resource component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sidelink resource component 342, which may be, for example, part of the one or more WWAN transceivers 310, the memory 340, the one or more processors 332, or any combination thereof, or may be a standalone component. FIG. 3B illustrates possible locations of the sidelink resource component 388, which may be, for example, part of the one or more WWAN transceivers 350, the memory 386, the one or more processors 384, or any combination thereof, or may be a standalone component. FIG. 3C illustrates possible locations of the sidelink resource component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sidelink resource component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
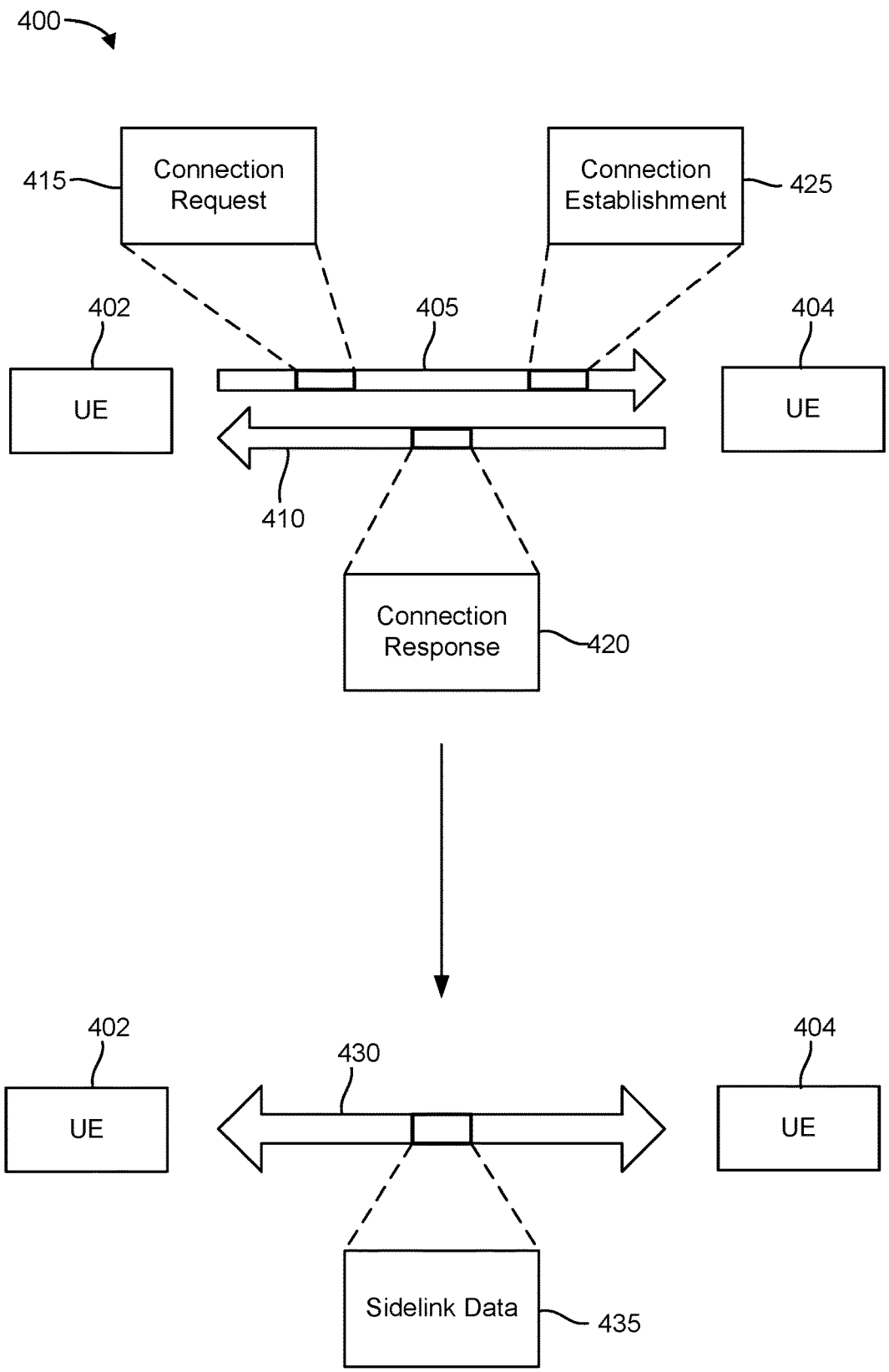
FIG. 4 illustrates an example of a wireless communications system that supports unicast sidelink establishment, according to aspects of the disclosure.

FIG. 4 illustrates an example of a wireless communications system 400 that supports wireless unicast sidelink establishment, according to aspects of the disclosure. In some examples, wireless communications system 400 may implement aspects of wireless communications systems 100, 200, and 250. Wireless communications system 400 may include a first UE 402 and a second UE 404, which may be examples of any of the UEs described herein. As specific examples, UEs 402 and 404 may correspond to V-UEs 160 in FIG. 1.

In the example of FIG. 4, the UE 402 may attempt to establish a unicast connection over a sidelink with the UE 404, which may be a V2X sidelink between the UE 402 and UE 404. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 402 may be referred to as an initiating UE that initiates the sidelink connection procedure, and the UE 404 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 402 and UE 404. For example, a transmission and reception capability matching may be negotiated between the UE 402 and UE 404. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 402 and UE 404. Additionally, a security association may be established between UE 402 and UE 404 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 402 and UE 404.

In some cases, UE 404 may create a service announcement (e.g., a service capability message) to transmit over a cellular network (e.g., cV2X) to assist the sidelink connection establishment. Conventionally, UE 402 may identify and locate candidates for sidelink communications based on a basic service message (BSM) broadcasted unencrypted by nearby UEs (e.g., UE 404). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 402 is able to detect the BSM(s). Accordingly, the service announcement transmitted by UE 404 and other nearby UEs (e.g., a discovery signal) may be an upper layer signal and broadcasted (e.g., in an NR sidelink broadcast). In some cases, the UE 404 may include one or more parameters for itself in the service announcement, including connection parameters and/or capabilities it possesses. The UE 402 may then monitor for and receive the broadcasted service announcement to identify potential UEs for corresponding sidelink connections. In some cases, the UE 402 may identify the potential UEs based on the capabilities each UE indicates in their respective service announcements.

The service announcement may include information to assist the UE 402 (e.g., or any initiating UE) to identify the UE transmitting the service announcement (UE 404 in the example of FIG. 4). For example, the service announcement may include channel information where direct communication requests may be sent. In some cases, the channel information may be RAT-specific (e.g., specific to LTE or NR) and may include a resource pool within which UE 402 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 402 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 404 in the example of FIG. 4), the initiating UE (UE 402 in the example of FIG. 4) may transmit a connection request 415 to the identified target UE 404. In some cases, the connection request 415 may be a first RRC message transmitted by the UE 402 to request a unicast connection with the UE 404 (e.g., an "RRCSetupRequest" message). For example, the unicast connection may utilize the PC5 interface for the sidelink, and the connection request 415 may be an RRC connection setup request message. Additionally, the UE 402 may use a sidelink signaling radio bearer 405 to transport the connection request 415.

After receiving the connection request 415, the UE 404 may determine whether to accept or reject the connection request 415. The UE 404 may base this determination on a transmission/reception capability, an ability to accommodate the unicast connection over the sidelink, a particular service indicated for the unicast connection, the contents to be transmitted over the unicast connection, or a combination thereof. For example, if the UE 402 wants to use a first RAT to transmit or receive data, but the UE 404 does not support the first RAT, then the UE 404 may reject the connection request 415. Additionally or alternatively, the UE 404 may reject the connection request 415 based on being unable to accommodate the unicast connection over the sidelink due to limited radio resources, a scheduling issue, etc. Accordingly, the UE 404 may transmit an indication of whether the request is accepted or rejected in a connection response 420. Similar to the UE 402 and the connection request 415, the UE 404 may use a sidelink signaling radio bearer 410 to transport the connection response 420. Additionally, the connection response 420 may be a second RRC message transmitted by the UE 404 in response to the connection request 415 (e.g., an "RRCResponse" message).

In some cases, sidelink signaling radio bearers 405 and 410 may be the same sidelink signaling radio bearer or may be separate sidelink signaling radio bearers. Accordingly, a radio link control (RLC) layer acknowledged mode (AM) may be used for sidelink signaling radio bearers 405 and 410. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 420 indicates that the UE 404 accepted the connection request 415, the UE 402 may then transmit a connection establishment 425 message on the sidelink signaling radio bearer 405 to indicate that the unicast connection setup is complete. In some cases, the connection establishment 425 may be a third RRC message (e.g., an "RRCSetupComplete" message). Each of the connection request 415, the connection response 420, and the connection establishment 425 may use a basic capability when being transported from one UE to the other UE to enable each UE to be able to receive and decode the corresponding transmission (e.g., the RRC messages).

Additionally, identifiers may be used for each of the connection request 415, the connection response 420, and the connection establishment 425. For example, the identifiers may indicate which UE 402/404 is transmitting which message and/or for which UE 402/404 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 415 and/or the connection response 420 for UE 402 and/or UE 404, respectively, to enable negotiation of corresponding AS layer parameters for the unicast connection. For example, the UE 402 and/or UE 404 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 402 and/or UE 404 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 402 and/or UE 404 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 402 and/or UE 404 may include PHY layer parameters when establishing the unicast connection to set a PHY layer context for the unicast connection. For example, the PHY layer context may indicate a transmission format (unless transmission profiles are included for each UE 402/404) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 425 message is transmitted). Before a security association (e.g., security context) is established between the UE 402 and UE 404, the sidelink signaling radio bearers 405 and 410 may not be protected. After a security association is established, the sidelink signaling radio bearers 405 and 410 may be protected. Accordingly, the security context may enable secure data transmissions over the unicast connection and the sidelink signaling radio bearers 405 and 410. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 404 may base its decision on whether to accept or reject the connection request 415 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 402 and UE 404 may communicate using the unicast connection over a sidelink 430, where sidelink data 435 is transmitted between the two UEs 402 and 404. The sidelink 430 may correspond to sidelinks 162 and/or 168 in FIG. 1. In some cases, the sidelink data 435 may include RRC messages transmitted between the two UEs 402 and 404. To maintain this unicast connection on sidelink 430, UE 402 and/or UE 404 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 402 or by both UE 402 and UE 404. Additionally or alternatively, a MAC control element (CE) (e.g., defined over sidelink 430) may be used to monitor the status of the unicast connection on sidelink 430 and maintain the connection. When the unicast connection is no longer needed (e.g., UE 402 travels far enough away from UE 404), either UE 402 and/or UE 404 may start a release procedure to drop the unicast connection over sidelink 430. Accordingly, subsequent RRC messages may not be transmitted between UE 402 and UE 404 on the unicast connection.

Figure 5:
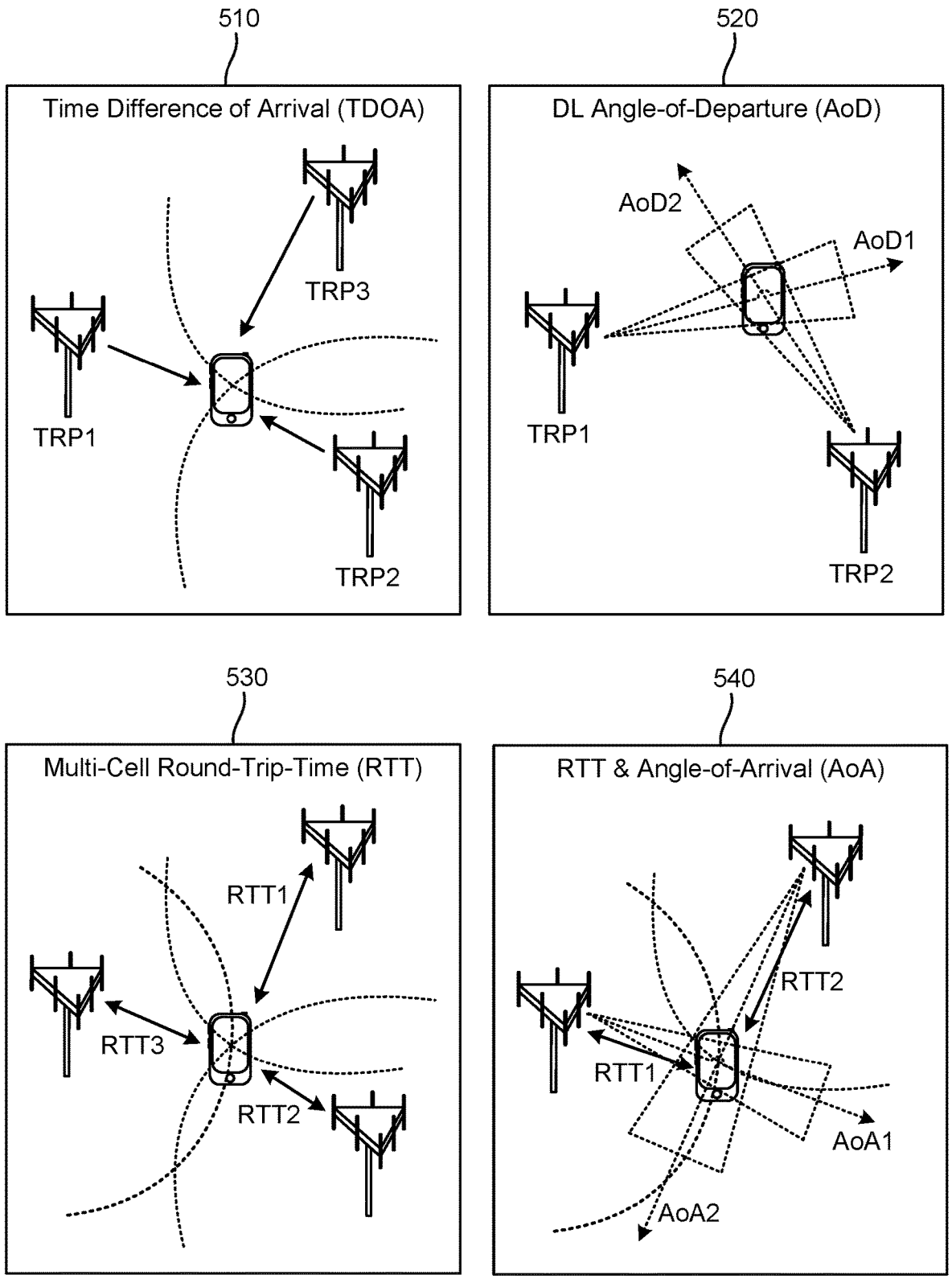
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
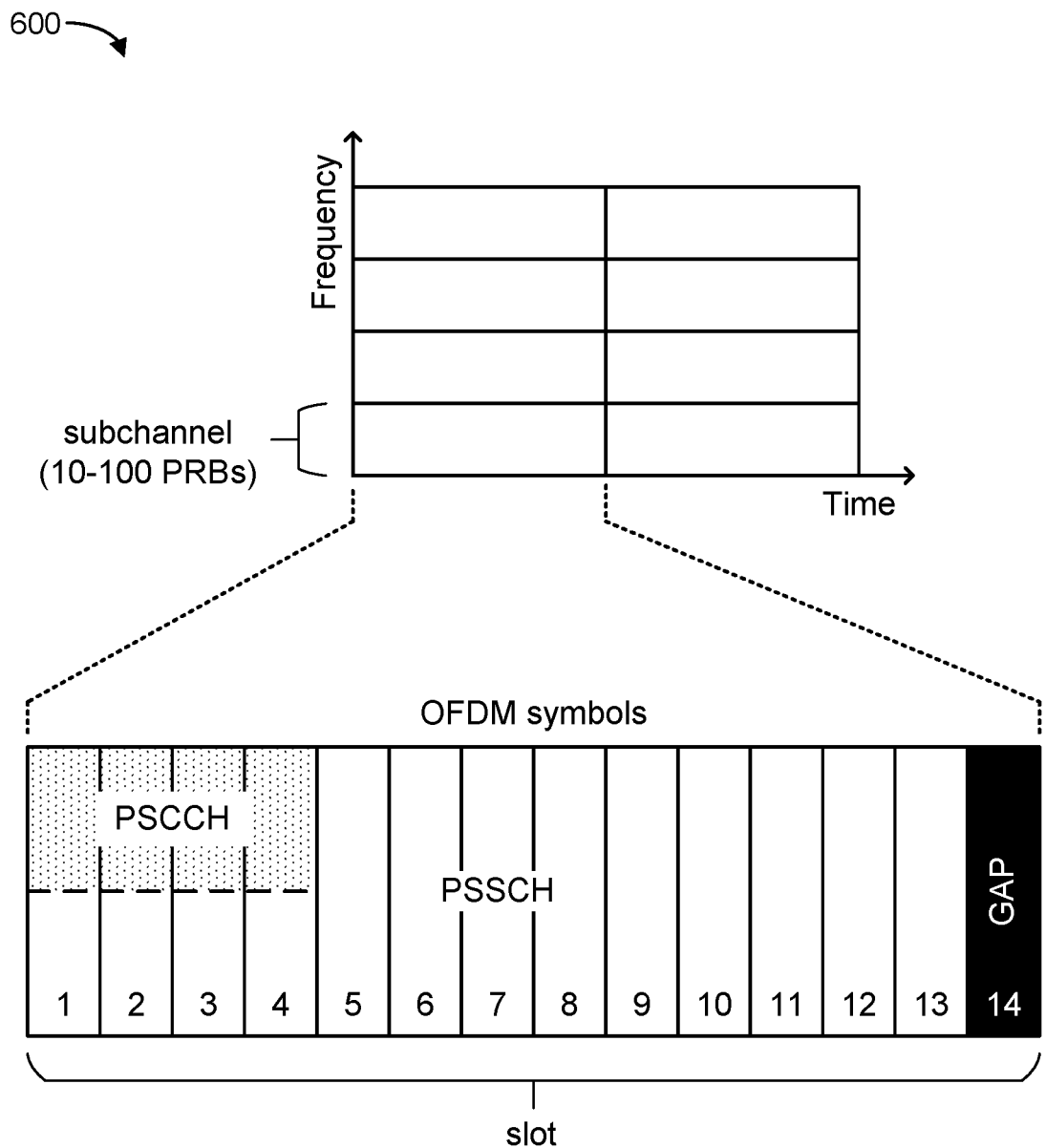
FIG. 6 illustrates time and frequency resources used for sidelink communication.

FIG. 6 illustrates time and frequency resources used for sidelink communication. A time-frequency grid 600 is divided into subchannels in the frequency domain and is divided into time slots in the time domain Each subchannel comprises a number (e.g., 10, 15, 20, 25, 50, 75, or 100) of physical resource blocks (PRBs), and each slot contains a number (e.g., 14) of OFDM symbols. A sidelink communication can be (pre)configured to occupy fewer than 14 symbols in a slot. The first symbol of the slot is repeated on the preceding symbol for automatic gain control (AGC) settling. The example slot shown in FIG. 4 contains a physical sidelink control channel (PSCCH) portion and a physical sidelink shared channel (PSSCH) portion, with a gap symbol following the PSCCH. PSCCH and PSSCH are transmitted in the same slot.

Sidelink communications take place within transmission or reception resource pools. Sidelink communications occupy one slot and one or more subchannels. Some slots are not available for sidelink, and some slots contain feedback resources. Sidelink communication can be preconfigured (e.g., preloaded on a UE) or configured (e.g., by a base station via RRC). The configuration of FIG. 6 is one example of a sidelink slot configuration, although other configurations are possible (e.g., some sidelink slot configurations may include two or more mini-slots, some sidelink slot configurations may be multiplexed with UL or DL communications, some sidelink slot configurations may include physical sidelink feedback channel (PSFCH) to ACK and/or NACK PSSCH(s) of previous slots, etc.).

In addition to the downlink-based, uplink-based, and downlink-and-uplink-based positioning methods, NR supports various sidelink positioning techniques. For example, link-level ranging signals can be used to estimate the distance between pairs of V-UEs or between a V-UE and a roadside unit (RSU), similar to a round-trip-time (RTT) positioning procedure.

Figure 7:
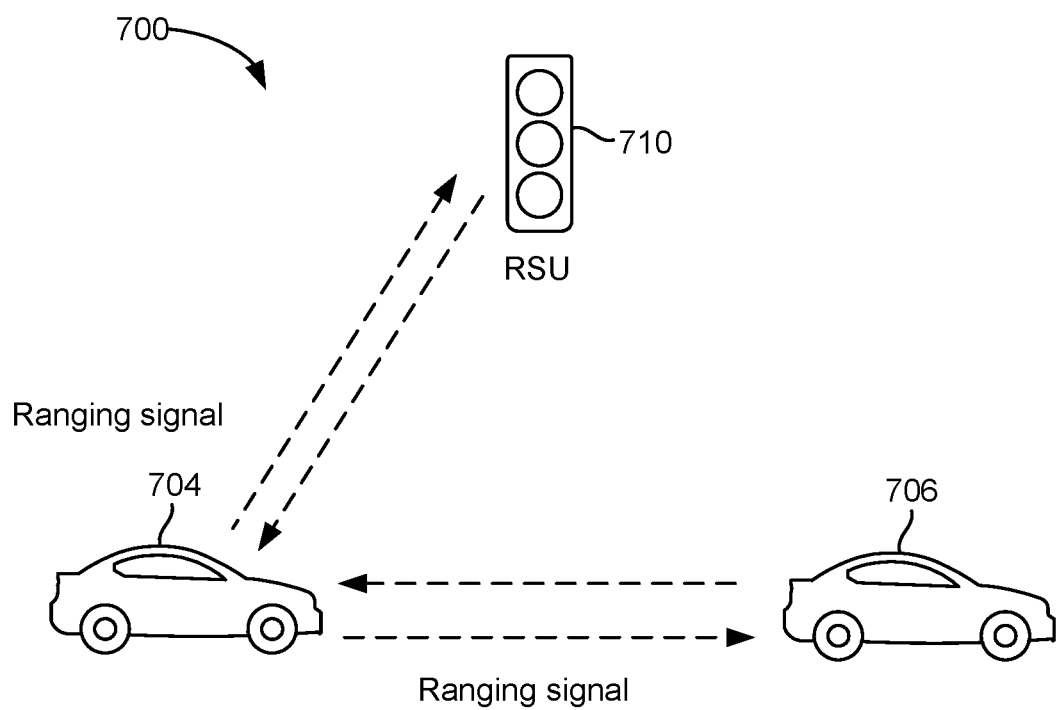
FIG. 7 illustrates an example wireless communication system in which a vehicle user equipment (V-UE) is exchanging ranging signals with a roadside unit (RSU) and another V-UE, according to aspects of the disclosure.

FIG. 7 illustrates an example wireless communication system 700 in which a V-UE 704 is exchanging ranging signals with an RSU 710 and another V-UE 706, according to aspects of the disclosure. As illustrated in FIG. 7, a wideband (e.g., FR1) ranging signal (e.g., a Zadoff Chu sequence) is transmitted by both end points (e.g., V-UE 704 and RSU 710 and V-UE 704 and V-UE 706). In an aspect, the ranging signals may be sidelink positioning reference signals (SL-PRS) transmitted by the involved V-UEs 704 and 706 on uplink resources. On receiving a ranging signal from a transmitter (e.g., V-UE 704), the receiver (e.g., RSU 710 and/or V-UE 706) responds by sending a ranging signal that includes a measurement of the difference between the reception time of the ranging signal and the transmission time of the response ranging signal, referred to as the reception-to-transmission (Rx-Tx) time difference measurement of the receiver.

Upon receiving the response ranging signal, the transmitter (or other positioning entity) can calculate the RTT between the transmitter and the receiver based on the receiver's Rx-Tx time difference measurement and a measurement of the difference between the transmission time of the first ranging signal and the reception time of the response ranging signal (referred to as the transmission-to-reception (Tx-Rx) time difference measurement of the transmitter). The transmitter (or other positioning entity) uses the RTT and the speed of light to estimate the distance between the transmitter and the receiver. If one or both of the transmitter and receiver are capable of beamforming, the angle between the V-UEs 704 and 706 may also be able to be determined. In addition, if the receiver provides its global positioning system (GPS) location in the response ranging signal, the transmitter (or other positioning entity) may be able to determine an absolute location of the transmitter, as opposed to a relative location of the transmitter with respect to the receiver.

As will be appreciated, ranging accuracy improves with the bandwidth of the ranging signals. Specifically, a higher bandwidth can better separate the different multipaths of the ranging signals.

Note that this positioning procedure assumes that the involved V-UEs are time-synchronized (i.e., their system frame time is the same as, or has a known offset relative to, the other V-UE(s)). In addition, although FIG. 7 illustrates two V-UEs, as will be appreciated, they need not be V-UEs, and may instead be any other type of UE capable of sidelink communication.

Figure 8:
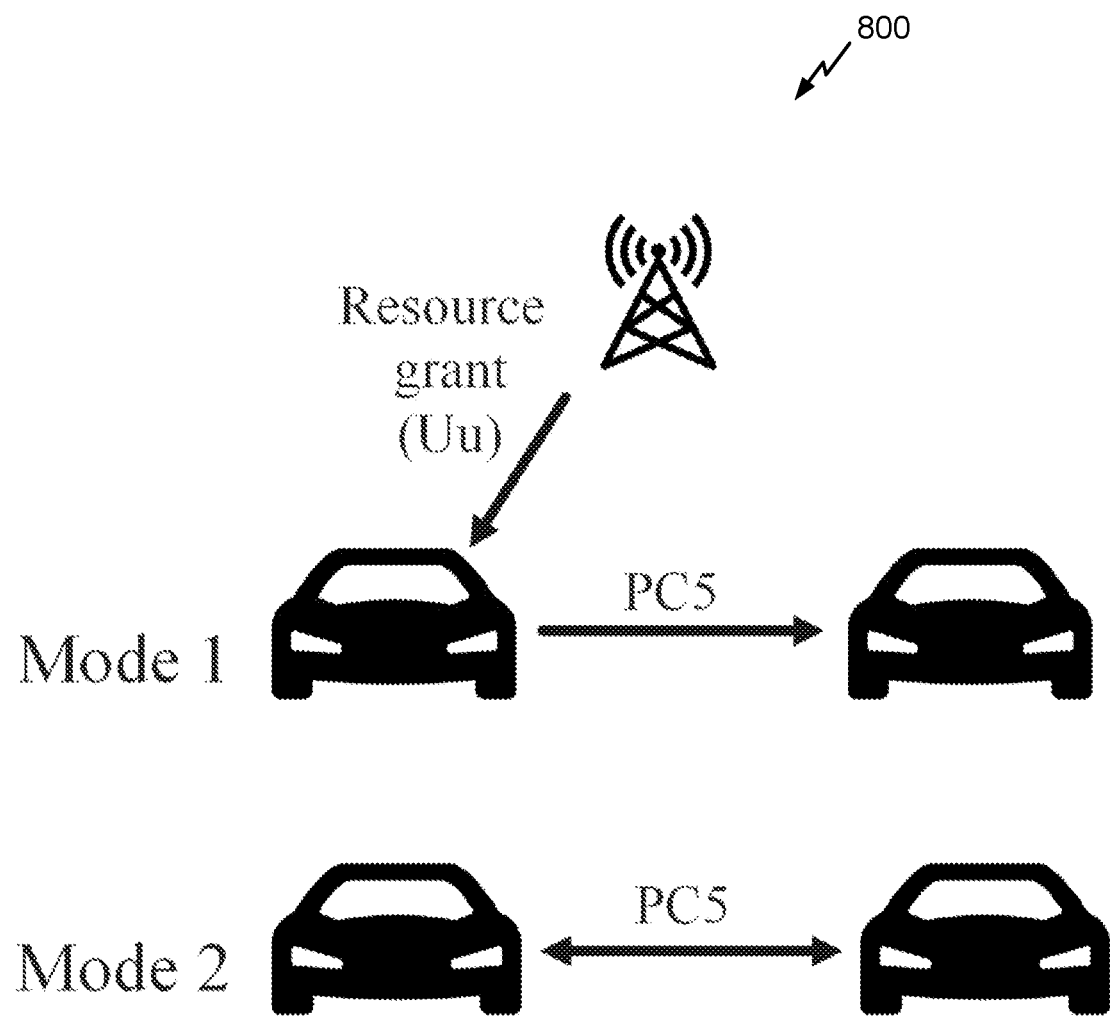
FIG. 8 illustrates sidelink communication scheduling (or resource allocation) schemes in accordance with aspects of the disclosure.

FIG. 8 illustrates sidelink communication scheduling (or resource allocation) schemes 800 in accordance with aspects of the disclosure. In some designs, resource allocation in V2X may be implemented via Mode 1, where gNB assigns Tx resources for sidelink communications through DCI 3_0. In other designs, resource allocation in V2X may be implemented via Mode 2, where a transmitting UE autonomously decides resources for sidelink communications. In some designs, the receiving UE behavior is the same for both Modes 1 and 2.

Referring to FIG. 8, Mode 1 supports dynamic grants (DG), configured grants (CG) type 1, and CG type 2. In some designs, CG type 1 is activated via RRC signaling from gNB. DCI 3_0 is transmitted by gNB to allocation time and frequency resources and indicates transmission timing. In some designs, the modulation and coding scheme (MCS) MCS is up to UE within limit set by gNB. In Mode 2, the transmitting UE performs channel sensing by blindly decoding all PSCCH channels and finds out reserved resources by other sidelink transmissions. The transmitting UE reports available resources to upper layer and upper layer decides resource usage.

5G NR V2X/sidelink communication has been introduced in 3GPP Rel-16/17. For Rel-16/17 V2X/sidelink communication, a number of sidelink signals/physical channels have been specified for transmission either in cellular spectrum (i.e., SL shares spectrum in licensed cellular band) or in dedicated intelligent transportation system (ITS) spectrum. Sidelink positioning will be introduced in 3GPP Rel-18. In some designs, one focus is on sidelink-based high-accuracy positioning for V2X, public safety and commercial use cases.

Sidelink positioning may support both relative and absolute positioning. Relative positioning (e.g., ranging) relates to determination of distance between two UEs. Absolute positioning relates to determination of geographic coordinates of a UE. Sidelink positioning may be performed based on measurement of sidelink positioning reference signals (PRS) transmitted over sidelink. The position estimation can be based on measurements of ToA, TDoA, AoA, RTT, etc., of the SL-PRS. The position estimation accuracy will be largely determined by the SL-PRS bandwidth.

Some sidelink/V2X applications have very high accuracy requirements. For example, sub-meter level accuracy may be needed to support vehicle maneuver coordination. Therefore, very large bandwidth (e.g., ~100 MHz or higher) PRS transmission may be used. Current ITS spectrum for V2X may not have such wide band available. For example, depending on the regions, there may be only 20-30 MHz ITS bandwidth available for V2X. In some designs, transmitting sidelink PRS over 20-30 MHz bandwidth may not provide a required positioning accuracy.

One possibility is to transmit SL-PRS in unlicensed spectrum. For example, UN-II 3 or UN-II 5 has large bandwidth available. However, unlicensed spectrum may be shared by other technologies (e.g., Wi-Fi), and access to the unlicensed spectrum may be subject to regulatory requirements. For example, one requirement in unlicensed spectrum may be a contention-based protocol such as listen before talk (LBT), whereby a device has to perform sensing (listen) to clear the channel before that device can transmit (talk).

In some designs, for sidelink positioning, SL positioning assistance messages are exchanged over sidelink prior to SL PRS. The pre-SL-PRS assistance message may carry positioning related configurations (e.g., between an anchor UE and a target UE, between two UEs doing ranging, etc.). SL PRS transmission is then performed between UEs (e.g., for timing or angle related measurements). SL positioning assistance messages may then be exchanged over sidelink post SL PRS. The post-SL-PRS message may carry SL PRS related measurements (e.g., timing report from one UE to another for range calculation).

In some designs, resource allocation for SL PRS transmission in Mode 1 operation may be problematic. For example, in Mode 1 operation, the pre-PRS and post-PRS assistance message transmissions will be scheduled by gNB; from lower layer perspective, the transmission may not look different than a regular sidelink transmission. However, for SL PRS transmission, the conventional Mode 1 scheduling may not be directly applicable, e.g. the signaling procedures for SL PRS scheduling could be different. Another aspect that is different in SL PRS transmission is Rx UE participation (e.g., SL PRS may be used for RTT measurement and PRS transmission from peer UEs may need to be coupled in some sense to facilitate the measurement). In current systems, SL Mode 1 scheduling is transparent to Rx UE and thus may not be optimal for SL PRS scheduling.

Aspects of the disclosure are directed to a sidelink position estimation procedure whereby a UE provides an SL PRS indication to a base station (e.g., so that the base station recognizes that requested resources are associated with SL PRS). The base station then provides, to the UE, a resource grant associated with communication of at least a first sidelink PRS for the sidelink position estimation procedure. Such aspects may provide various technical advantages, such as facilitating scheduling of SL PRS by gNB, which may be a preferred scheduling scheme for sidelink operation in licensed band, while also facilitating SL RTT measurements and/or reducing SL PRS scheduling signaling overhead.

Figure 9:
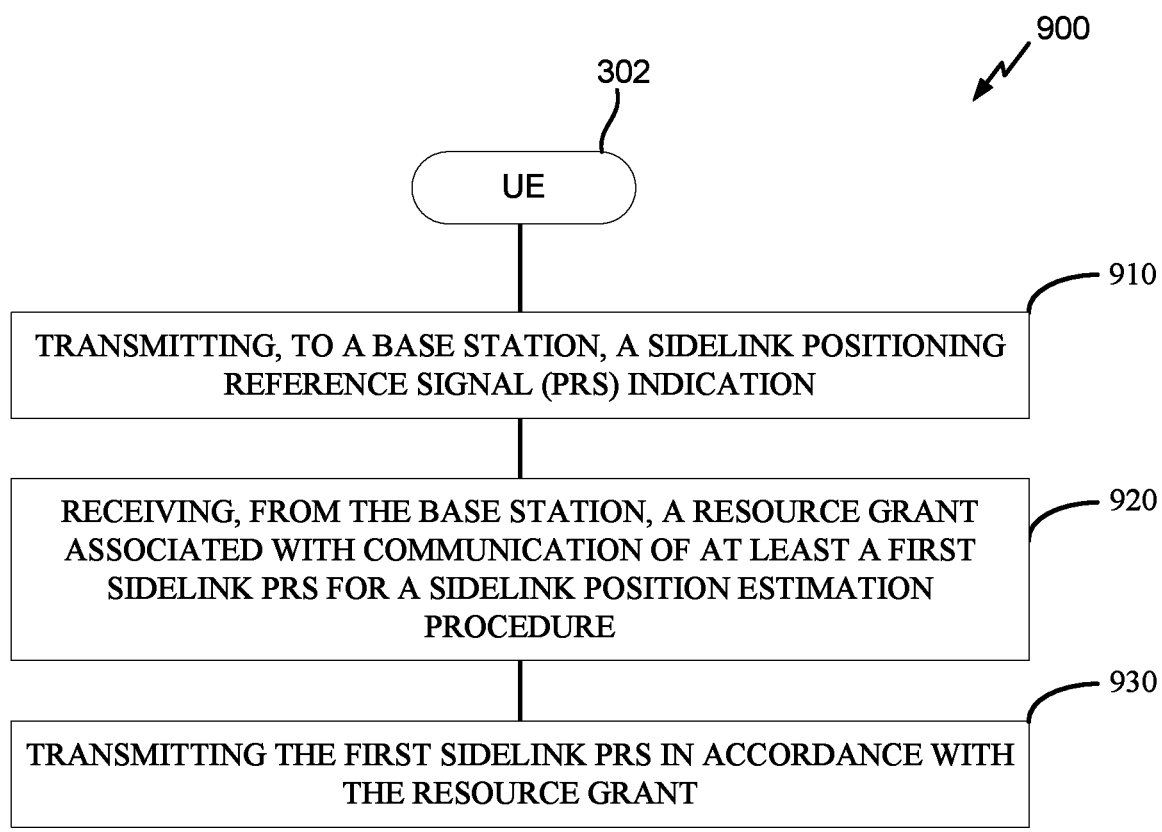
FIG. 9 illustrates an exemplary process of wireless communication, according to aspects of the disclosure.

FIG. 9 illustrates an exemplary process 900 of wireless communication, according to aspects of the disclosure. In an aspect, the process 900 may be performed by a UE, such as UE 302.

Referring to FIG. 9, at 910, UE 302 (e.g., transmitter 314 or 324, etc.) transmits, to a base station, a sidelink positioning reference signal (PRS) indication. In some designs, a means for performing the transmission of 910 may be performed by transmitter 314 or 324 of UE 302.

Referring to FIG. 9, at 920, UE 302 (e.g., receiver 312 or 322, etc.) receives, from the base station, a resource grant associated with communication of at least a first sidelink PRS for a sidelink position estimation procedure. In some designs, a means for performing the reception of 920 may be performed by receiver 312 or 322 of UE 302.

Referring to FIG. 9, at 930, UE 302 (e.g., transmitter 314 or 324, etc.) transmits the first sidelink PRS in accordance with the resource grant. In some designs, a means for performing the transmission of 930 may be performed by transmitter 314 or 324 of UE 302.

Figure 10:
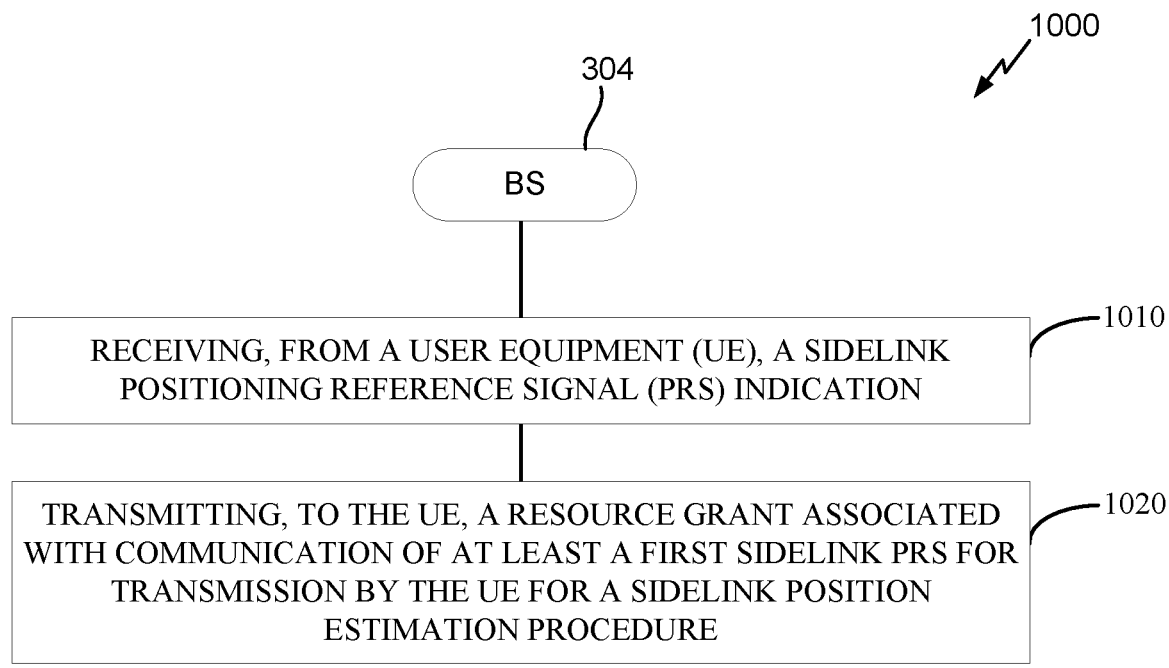
FIG. 10 illustrates an exemplary process of wireless communication, according to aspects of the disclosure.

FIG. 10 illustrates an exemplary process 1000 of wireless communication, according to aspects of the disclosure. In an aspect, the process 1000 may be performed by a BS, such as BS 304.

Referring to FIG. 10, at 1010, BS 304 (e.g., receiver 352 or 362, etc.) receives, from a user equipment (UE), a sidelink positioning reference signal (PRS) indication. In some designs, a means for performing the reception of 1010 may be performed by receiver 352 or 362 of BS 304.

Referring to FIG. 10, at 1020, BS 304 (e.g., transmitter 354 or 364, etc.) transmits, to the UE, a resource grant associated with communication of at least a first sidelink PRS for transmission by the UE for a sidelink position estimation procedure. In some designs, a means for performing the transmission of 1020 may be performed by transmitter 354 or 364 of BS 304.

Referring to FIGS. 9-10, in some designs, the UE (e.g., SL transmitting (Tx) UE)) indicates (at 910 or 1010) to gNB its transmission would be SL PRS transmission (using SR or SL BSR). The gNB (at 920 or 1020) grants the SL Tx UE for SL PRS transmission (using legacy or new DCI format). The SL Tx UE (at 930) transmits SL PRS in the granted resource, which can be standalone SL PRS or a combination PSCCH and PRS. Additionally, the SL PRS resource may be used for multiple UEs' SL PRS transmission (the Tx UE and at least another UE), e.g., upon receiving of the resource grant; the SL Tx UE may further grant/indicate the resource to at least another UE for that UE's SL PRS transmission (motivation is to facilitate RTT measurement).

Referring to FIGS. 9-10, in some designs, the sidelink PRS indication is associated with a scheduling request (SR). In some designs, the sidelink PRS indication is based on information included in the SR, or the sidelink PRS indication is based on a physical uplink control channel (PUCCH) format associated with the SR, or a combination thereof. In some designs, the SR is different from legacy SR (e.g., carrying information to indicate that this is for SL PRS scheduling request, or using a special PUCCH format to imply that), so gNB understands that this is for SL PRS scheduling. Additionally, in some designs, there may not be SL BSR transmission for SL PRS scheduling (e.g., gNB can grant resource for SL PRS transmission upon receiving of the special SR from the Tx UE).

Referring to FIGS. 9-10, in some designs, the sidelink PRS indication is associated with a sidelink buffer status report (BSR). In some designs, the sidelink PRS indication is based on a logical channel group identifier (ID) of the BSR, a destination index of the BSR, a buffer size value of the BSR, a sidelink PRS indication field of the BSR, or any combination thereof. For example, logical channel group ID, destination index, and buffer size are the fields in a legacy SL BSR. Here, in a BSR-specific example, a new release with SL positioning may be specified, whereby a 'special' value for one (or multiple) of the field(s) can be configured, with this special value indicating that purpose of sending the BSR is to request resource allocation for SL PRS transmission. In this case, upon receiving a SL BSR, gNB can determine whether the SL BSR is a regular/legacy BSR requesting resource allocation for PSSCH transmission, or a BSR requesting resource for SL PRS transmission. The special value(s) of one or multiple of the fields can be pre-determined (e.g., specified in standards), or pre-configured, or configured to the UEs by the network (gNB).

Referring to FIGS. 9-10, in some designs, the BSR is configured to indicate one or more requested sidelink PRS parameters. In some designs, the one or more requested sidelink PRS parameters comprise a PRS duration, a PRS resource period, a PRS bandwidth, or any combination thereof. In some designs, the SL BSR is different from legacy SL BSR, e.g., the SL BSR carries SL PRS related information. The SL BSR may imply that the BSR is for SL PRS scheduling, e.g., using a special logical channel group ID (LCG ID), using a special destination index, using a special value of buffer size. In some designs, the SL BSR may indicate that the BSR is for SL PRS scheduling, e.g., add a field to the SL BSR to explicitly indicate that the SL BSR is requesting resource for SL PRS transmission. In some designs, the SL BSR may also carry SL PRS related information, e.g., requested PRS duration (e.g., number of OFDM symbols), requested PRS resource period (for periodic SL PRS transmission), requested PRS bandwidth (e.g., number of PRBs or subchannels). In some designs, if the SL BSR is used, the SR sent by the Tx UE to the gNB may be a legacy version (e.g., no SL indication conveyed by SR).

Referring to FIGS. 9-10, in some designs, the resource grant is associated with a DCI format that is not specific to sidelink PRS scheduling. For example, in 3GPP Rel-16, DCI format 3_0 is used for SL scheduling (PSCCH and PSSCH transmission. In this case, some code point(s) may be used to imply that the DCI transmission is for SL PRS scheduling. In other designs, the resource grant is associated with a downlink control information (DCI) format that is specific to sidelink PRS scheduling. For example, this may be preferable given the quite different information needed for SL PRS scheduling. For example, HARQ process ID/NDI/HARQ feedback timer/PUCCH resource indication/HARQ codebook may no longer be needed in the DCI for SL PRS scheduling. The new DCI may indicate SL PRS related parameters, e.g., time/frequency resource allocation (e.g., similar to PSSCH scheduling but may have different granularity), SL PRS pattern (e.g., PRS mapping RE space in frequency for comb-type PRS mapping, PRS RE offset, etc.), etc.

Referring to FIGS. 9-10, in some designs, the first sidelink PRS is transmitted as a standalone sidelink PRS (e.g., the first sidelink PRS only conveys PRS, without accompanying control signal, such as PSCCH). So, a UE receiving SL PRS needs to detect the SL PRS only. In other designs, the first sidelink PRS is transmitted in association with a control signal (e.g., PSCCH). So, a UE receiving SL PRS can detect the control signal first, and if the control signal is detected, the Rx UE measures the SL PRS.

Referring to FIGS. 9-10, in some designs, the resource grant is associated with communication of the first sidelink PRS only. In some designs, the resource grant is further associated with communication of a second sidelink PRS for transmission by another UE (e.g., for RTT measurement, etc.). For example, an SL Tx UE may receive the resource grant from the gNB, and at least one other UE may use at least part of the granted resource for SL PRS transmission (e.g., for facilitating RTT measurement for SL ranging, for reducing Uu-based control signaling overhead when there are many UEs transmitting SL PRS, etc.).

Referring to FIGS. 9-10, in some designs, the sidelink PRS indication includes reference to the another UE. For example, the SL PRS operation may be known to gNB. In an example, the Tx UE requests for resource for itself and at least another UE (explicitly indicated to gNB). The gNB grants resources for the two UEs, e.g., the DCI can indicate the SL PRS resource allocation for more than one UEs. The Tx UE transmits in the portion that has been granted to itself, and indicates to its peer UE(s) via sidelink signaling to transmit SL PRS in the correspondingly granted resource(s) (other portions of the resource).

Referring to FIGS. 9-10, in other designs, the sidelink PRS indication does not include reference to the another UE. For example, the SL PRS operation may be transparent to gNB (e.g., gNB is not aware whether the request from the Tx UE is for SL PRS from one or from multiple UEs). In an example, the Tx UE may just grants/indicate its peer UE(s) to use some of the granted resource, without direct knowledge or involvement by gNB. For example, the Tx UE may transmit its SL PRS in the first half of the granted SL PRS resource, and the Tx UE may indicate to its peer UE to transmit SL PRS in the second half of the granted SL PRS resource (the two transmissions are TDM multiplexed).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: transmitting, to a base station, a sidelink positioning reference signal (PRS) indication; receiving, from the base station, a resource grant associated with communication of at least a first sidelink PRS for a sidelink position estimation procedure; and transmitting the first sidelink PRS in accordance with the resource grant.

Clause 2. The method of clause 1, wherein the sidelink PRS indication is associated with a scheduling request (SR).

Clause 3. The method of clause 2, wherein the sidelink PRS indication is based on information included in the SR, or wherein the sidelink PRS indication is based on a physical uplink control channel (PUCCH) format associated with the SR, or a combination thereof.

Clause 4. The method of any of clauses 1 to 3, wherein the sidelink PRS indication is associated with a sidelink buffer status report (BSR).

Clause 5. The method of clause 4, wherein the sidelink PRS indication is based on a logical channel group identifier (ID) of the BSR, a destination index of the BSR, a buffer size value of the BSR, a sidelink PRS indication field of the BSR, or any combination thereof.

Clause 6. The method of any of clauses 4 to 5, wherein the BSR is configured to indicate one or more requested sidelink PRS parameters.

Clause 7. The method of clause 6, wherein the one or more requested sidelink PRS parameters comprise a PRS duration, a PRS resource period, a PRS bandwidth, or any combination thereof.

Clause 8. The method of any of clauses 1 to 7, wherein the resource grant is associated with a downlink control information (DCI) format that is specific to sidelink PRS scheduling.

Clause 9. The method of any of clauses 1 to 8, wherein the first sidelink PRS is transmitted as a standalone sidelink PRS, or wherein the first sidelink PRS is transmitted in association with a control signal.

Clause 10. The method of any of clauses 1 to 9, wherein the resource grant is associated with communication of the first sidelink PRS only.

Clause 11. The method of any of clauses 1 to 10, wherein the resource grant is further associated with communication of a second sidelink PRS for transmission by another UE.

Clause 12. The method of clause 11, wherein the sidelink PRS indication includes reference to the another UE.

Clause 13. The method of any of clauses 11 to 12, wherein the sidelink PRS indication does not include reference to the another UE.

Clause 14. A method of operating a base station, comprising: receiving, from a user equipment (UE), a sidelink positioning reference signal (PRS) indication; and transmitting, to the UE, a resource grant associated with communication of at least a first sidelink PRS for transmission by the UE for a sidelink position estimation procedure.

Clause 15. The method of clause 14, wherein the sidelink PRS indication is associated with a scheduling request (SR).

Clause 16. The method of clause 15, wherein the sidelink PRS indication is based on information included in the SR, or wherein the sidelink PRS indication is based on a physical uplink control channel (PUCCH) format associated with the SR, or a combination thereof.

Clause 17. The method of any of clauses 14 to 16, wherein the sidelink PRS indication is associated with a sidelink buffer status report (BSR).

Clause 18. The method of clause 17, wherein the sidelink PRS indication is based on a logical channel group identifier (ID) of the BSR, a destination index of the BSR, a buffer size value of the BSR, a sidelink PRS indication field of the BSR, or any combination thereof.

Clause 19. The method of any of clauses 17 to 18, wherein the BSR is configured to indicate one or more requested sidelink PRS parameters.

Clause 20. The method of clause 19, wherein the one or more requested sidelink PRS parameters comprise a PRS duration, a PRS resource period, a PRS bandwidth, or any combination thereof.

Clause 21. The method of any of clauses 14 to 20, wherein the resource grant is associated with a downlink control information (DCI) format that is specific to sidelink PRS scheduling.

Clause 22. The method of any of clauses 14 to 21, wherein the first sidelink PRS is for transmission as a standalone sidelink PRS, or wherein the first sidelink PRS is for transmission in association with a control signal.

Clause 23. The method of any of clauses 14 to 22, wherein the resource grant is associated with communication of the first sidelink PRS only.

Clause 24. The method of any of clauses 14 to 23, wherein the resource grant is further associated with communication of a second sidelink PRS for transmission by another UE.

Clause 25. The method of clause 24, wherein the sidelink PRS indication includes reference to the another UE.

Clause 26. The method of any of clauses 24 to 25, wherein the sidelink PRS indication does not include reference to the another UE.

Clause 27. A user equipment (UE), comprising: a memory; at least one transceiver; and at least one processor communicatively coupled to the memory and the at least one transceiver, the at least one processor configured to: transmit, via the at least one transceiver, to a base station, a sidelink positioning reference signal (PRS) indication; receive, via the at least one transceiver, from the base station, a resource grant associated with communication of at least a first sidelink PRS for a sidelink position estimation procedure; and transmit, via the at least one transceiver, the first sidelink PRS in accordance with the resource grant.

Clause 28. The UE of clause 27, wherein the sidelink PRS indication is associated with a scheduling request (SR).

Clause 29. The UE of clause 28, wherein the sidelink PRS indication is based on information included in the SR, or wherein the sidelink PRS indication is based on a physical uplink control channel (PUCCH) format associated with the SR, or a combination thereof.

Clause 30. The UE of any of clauses 27 to 29, wherein the sidelink PRS indication is associated with a sidelink buffer status report (BSR).

Clause 31. The UE of clause 30, wherein the sidelink PRS indication is based on a logical channel group identifier (ID) of the BSR, a destination index of the BSR, a buffer size value of the BSR, a sidelink PRS indication field of the BSR, or any combination thereof.

Clause 32. The UE of any of clauses 30 to 31, wherein the BSR is configured to indicate one or more requested sidelink PRS parameters.

Clause 33. The UE of clause 32, wherein the one or more requested sidelink PRS parameters comprise a PRS duration, a PRS resource period, a PRS bandwidth, or any combination thereof.

Clause 34. The UE of any of clauses 27 to 33, wherein the resource grant is associated with a downlink control information (DCI) format that is specific to sidelink PRS scheduling.

Clause 35. The UE of any of clauses 27 to 34, wherein the first sidelink PRS is transmitted as a standalone sidelink PRS, or wherein the first sidelink PRS is transmitted in association with a control signal.

Clause 36. The UE of any of clauses 27 to 35, wherein the resource grant is associated with communication of the first sidelink PRS only.

Clause 37. The UE of any of clauses 27 to 36, wherein the resource grant is further associated with communication of a second sidelink PRS for transmission by another UE.

Clause 38. The UE of clause 37, wherein the sidelink PRS indication includes reference to the another UE.

Clause 39. The UE of any of clauses 37 to 38, wherein the sidelink PRS indication does not include reference to the another UE.

Clause 40. A base station, comprising: a memory; at least one transceiver; and at least one processor communicatively coupled to the memory and the at least one transceiver, the at least one processor configured to: receive, via the at least one transceiver, from a user equipment (UE), a sidelink positioning reference signal (PRS) indication; and transmit, via the at least one transceiver, to the UE, a resource grant associated with communication of at least a first sidelink PRS for transmission by the UE for a sidelink position estimation procedure.

Clause 41. The base station of clause 40, wherein the sidelink PRS indication is associated with a scheduling request (SR).

Clause 42. The base station of clause 41, wherein the sidelink PRS indication is based on information included in the SR, or wherein the sidelink PRS indication is based on a physical uplink control channel (PUCCH) format associated with the SR, or a combination thereof.

Clause 43. The base station of any of clauses 40 to 42, wherein the sidelink PRS indication is associated with a sidelink buffer status report (BSR).

Clause 44. The base station of clause 43, wherein the sidelink PRS indication is based on a logical channel group identifier (ID) of the BSR, a destination index of the BSR, a buffer size value of the BSR, a sidelink PRS indication field of the BSR, or any combination thereof.

Clause 45. The base station of any of clauses 43 to 44, wherein the BSR is configured to indicate one or more requested sidelink PRS parameters.

Clause 46. The base station of clause 45, wherein the one or more requested sidelink PRS parameters comprise a PRS duration, a PRS resource period, a PRS bandwidth, or any combination thereof.

Clause 47. The base station of any of clauses 40 to 46, wherein the resource grant is associated with a downlink control information (DCI) format that is specific to sidelink PRS scheduling.

Clause 48. The base station of any of clauses 40 to 47, wherein the first sidelink PRS is for transmission as a standalone sidelink PRS, or wherein the first sidelink PRS is for transmission in association with a control signal.

Clause 49. The base station of any of clauses 40 to 48, wherein the resource grant is associated with communication of the first sidelink PRS only.

Clause 50. The base station of any of clauses 40 to 49, wherein the resource grant is further associated with communication of a second sidelink PRS for transmission by another UE.

Clause 51. The base station of clause 50, wherein the sidelink PRS indication includes reference to the another UE.

Clause 52. The base station of any of clauses 50 to 51, wherein the sidelink PRS indication does not include reference to the another UE.

Clause 53. A user equipment (UE), comprising: means for transmitting, to a base station, a sidelink positioning reference signal (PRS) indication; means for receiving, from the base station, a resource grant associated with communication of at least a first sidelink PRS for a sidelink position estimation procedure; and means for transmitting the first sidelink PRS in accordance with the resource grant.

Clause 54. The UE of clause 53, wherein the sidelink PRS indication is associated with a scheduling request (SR).

Clause 55. The UE of clause 54, wherein the sidelink PRS indication is based on information included in the SR, or wherein the sidelink PRS indication is based on a physical uplink control channel (PUCCH) format associated with the SR, or a combination thereof.

Clause 56. The UE of any of clauses 53 to 55, wherein the sidelink PRS indication is associated with a sidelink buffer status report (BSR).

Clause 57. The UE of clause 56, wherein the sidelink PRS indication is based on a logical channel group identifier (ID) of the BSR, a destination index of the BSR, a buffer size value of the BSR, a sidelink PRS indication field of the BSR, or any combination thereof.

Clause 58. The UE of any of clauses 56 to 57, wherein the BSR is configured to indicate one or more requested sidelink PRS parameters.

Clause 59. The UE of clause 58, wherein the one or more requested sidelink PRS parameters comprise a PRS duration, a PRS resource period, a PRS bandwidth, or any combination thereof.

Clause 60. The UE of any of clauses 53 to 59, wherein the resource grant is associated with a downlink control information (DCI) format that is specific to sidelink PRS scheduling.

Clause 61. The UE of any of clauses 53 to 60, wherein the first sidelink PRS is transmitted as a standalone sidelink PRS, or wherein the first sidelink PRS is transmitted in association with a control signal.

Clause 62. The UE of any of clauses 53 to 61, wherein the resource grant is associated with communication of the first sidelink PRS only.

Clause 63. The UE of any of clauses 53 to 62, wherein the resource grant is further associated with communication of a second sidelink PRS for transmission by another UE.

Clause 64. The UE of clause 63, wherein the sidelink PRS indication includes reference to the another UE.

Clause 65. The UE of any of clauses 63 to 64, wherein the sidelink PRS indication does not include reference to the another UE.

Clause 66. A base station, comprising: means for receiving, from a user equipment (UE), a sidelink positioning reference signal (PRS) indication; and means for transmitting, to the UE, a resource grant associated with communication of at least a first sidelink PRS for transmission by the UE for a sidelink position estimation procedure.

Clause 67. The base station of clause 66, wherein the sidelink PRS indication is associated with a scheduling request (SR).

Clause 68. The base station of clause 67, wherein the sidelink PRS indication is based on information included in the SR, or wherein the sidelink PRS indication is based on a physical uplink control channel (PUCCH) format associated with the SR, or a combination thereof.

Clause 69. The base station of any of clauses 66 to 68, wherein the sidelink PRS indication is associated with a sidelink buffer status report (BSR).

Clause 70. The base station of clause 69, wherein the sidelink PRS indication is based on a logical channel group identifier (ID) of the BSR, a destination index of the BSR, a buffer size value of the BSR, a sidelink PRS indication field of the BSR, or any combination thereof.

Clause 71. The base station of any of clauses 69 to 70, wherein the BSR is configured to indicate one or more requested sidelink PRS parameters.

Clause 72. The base station of clause 71, wherein the one or more requested sidelink PRS parameters comprise a PRS duration, a PRS resource period, a PRS bandwidth, or any combination thereof.

Clause 73. The base station of any of clauses 66 to 72, wherein the resource grant is associated with a downlink control information (DCI) format that is specific to sidelink PRS scheduling.

Clause 74. The base station of any of clauses 66 to 73, wherein the first sidelink PRS is for transmission as a standalone sidelink PRS, or wherein the first sidelink PRS is for transmission in association with a control signal.

Clause 75. The base station of any of clauses 66 to 74, wherein the resource grant is associated with communication of the first sidelink PRS only.

Clause 76. The base station of any of clauses 66 to 75, wherein the resource grant is further associated with communication of a second sidelink PRS for transmission by another UE.

Clause 77. The base station of clause 76, wherein the sidelink PRS indication includes reference to the another UE.

Clause 78. The base station of any of clauses 76 to 77, wherein the sidelink PRS indication does not include reference to the another UE.

Clause 79. A non-transitory computer-readable medium storing computer-executable instructions that, when executed by a user equipment (UE), cause the UE to: transmit, to a base station, a sidelink positioning reference signal (PRS) indication; receive, from the base station, a resource grant associated with communication of at least a first sidelink PRS for a sidelink position estimation procedure; and transmit the first sidelink PRS in accordance with the resource grant.

Clause 80. The non-transitory computer-readable medium of clause 79, wherein the sidelink PRS indication is associated with a scheduling request (SR).

Clause 81. The non-transitory computer-readable medium of clause 80, wherein the sidelink PRS indication is based on information included in the SR, or wherein the sidelink PRS indication is based on a physical uplink control channel (PUCCH) format associated with the SR, or a combination thereof.

Clause 82. The non-transitory computer-readable medium of any of clauses 79 to 81, wherein the sidelink PRS indication is associated with a sidelink buffer status report (BSR).

Clause 83. The non-transitory computer-readable medium of clause 82, wherein the sidelink PRS indication is based on a logical channel group identifier (ID) of the BSR, a destination index of the BSR, a buffer size value of the BSR, a sidelink PRS indication field of the BSR, or any combination thereof.

Clause 84. The non-transitory computer-readable medium of any of clauses 82 to 83, wherein the BSR is configured to indicate one or more requested sidelink PRS parameters.

Clause 85. The non-transitory computer-readable medium of clause 84, wherein the one or more requested sidelink PRS parameters comprise a PRS duration, a PRS resource period, a PRS bandwidth, or any combination thereof.

Clause 86. The non-transitory computer-readable medium of any of clauses 79 to 85, wherein the resource grant is associated with a downlink control information (DCI) format that is specific to sidelink PRS scheduling.

Clause 87. The non-transitory computer-readable medium of any of clauses 79 to 86, wherein the first sidelink PRS is transmitted as a standalone sidelink PRS, or wherein the first sidelink PRS is transmitted in association with a control signal.

Clause 88. The non-transitory computer-readable medium of any of clauses 79 to 87, wherein the resource grant is associated with communication of the first sidelink PRS only.

Clause 89. The non-transitory computer-readable medium of any of clauses 79 to 88, wherein the resource grant is further associated with communication of a second sidelink PRS for transmission by another UE.

Clause 90. The non-transitory computer-readable medium of clause 89, wherein the sidelink PRS indication includes reference to the another UE.

Clause 91. The non-transitory computer-readable medium of any of clauses 89 to 90, wherein the sidelink PRS indication does not include reference to the another UE.

Clause 92. A non-transitory computer-readable medium storing computer-executable instructions that, when executed by a base station, cause the base station to: receive, from a user equipment (UE), a sidelink positioning reference signal (PRS) indication; and transmit, to the UE, a resource grant associated with communication of at least a first sidelink PRS for transmission by the UE for a sidelink position estimation procedure.

Clause 93. The non-transitory computer-readable medium of clause 92, wherein the sidelink PRS indication is associated with a scheduling request (SR).

Clause 94. The non-transitory computer-readable medium of clause 93, wherein the sidelink PRS indication is based on information included in the SR, or wherein the sidelink PRS indication is based on a physical uplink control channel (PUCCH) format associated with the SR, or a combination thereof.

Clause 95. The non-transitory computer-readable medium of any of clauses 92 to 94, wherein the sidelink PRS indication is associated with a sidelink buffer status report (BSR).

Clause 96. The non-transitory computer-readable medium of clause 95, wherein the sidelink PRS indication is based on a logical channel group identifier (ID) of the BSR, a destination index of the BSR, a buffer size value of the BSR, a sidelink PRS indication field of the BSR, or any combination thereof.

Clause 97. The non-transitory computer-readable medium of any of clauses 95 to 96, wherein the BSR is configured to indicate one or more requested sidelink PRS parameters.

Clause 98. The non-transitory computer-readable medium of clause 97, wherein the one or more requested sidelink PRS parameters comprise a PRS duration, a PRS resource period, a PRS bandwidth, or any combination thereof.

Clause 99. The non-transitory computer-readable medium of any of clauses 92 to 98, wherein the resource grant is associated with a downlink control information (DCI) format that is specific to sidelink PRS scheduling.

Clause 100. The non-transitory computer-readable medium of any of clauses 92 to 99, wherein the first sidelink PRS is for transmission as a standalone sidelink PRS, or wherein the first sidelink PRS is for transmission in association with a control signal.

Clause 101. The non-transitory computer-readable medium of any of clauses 92 to 100, wherein the resource grant is associated with communication of the first sidelink PRS only.

Clause 102. The non-transitory computer-readable medium of any of clauses 92 to 101, wherein the resource grant is further associated with communication of a second sidelink PRS for transmission by another UE.

Clause 103. The non-transitory computer-readable medium of clause 102, wherein the sidelink PRS indication includes reference to the another UE.

Clause 104. The non-transitory computer-readable medium of any of clauses 102 to 103, wherein the sidelink PRS indication does not include reference to the another UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
   transmitting, to a wireless network component, a sidelink positioning reference signal (PRS) indication that comprises a requested sidelink PRS bandwidth amount;
   receiving, from the wireless network component in response to the sidelink PRS indication, a resource grant associated with communication of at least a first sidelink PRS for a sidelink position estimation procedure; and
   transmitting the first sidelink PRS in accordance with the resource grant.

2. The method of claim 1, wherein the requested sidelink PRS bandwidth amount corresponds to a requested number of physical resource blocks (PRBs) or a requested number of subchannels.

3. The method of claim 1, wherein the resource grant is associated with a downlink control information (DCI) format that is specific to sidelink PRS scheduling.

4. The method of claim 1, wherein the sidelink PRS indication is associated with a scheduling request (SR).

5. The method of claim 4,
   wherein the sidelink PRS indication is based on information included in the SR, or
   wherein the sidelink PRS indication is based on a physical uplink control channel (PUCCH) format associated with the SR, or
   a combination thereof.

6. The method of claim 1,
   wherein the first sidelink PRS is transmitted as a stand-alone sidelink PRS, or
   wherein the first sidelink PRS is transmitted in association with a control signal, or
   wherein the resource grant is associated with communication of the first sidelink PRS only, or
   wherein the resource grant is further associated with communication of a second sidelink PRS for transmission by another UE, or
   wherein the sidelink PRS indication includes reference to the another UE, or wherein the sidelink PRS indication does not include reference to the another UE, or
   any combination thereof.

7. The method of claim 1, wherein the sidelink PRS indication is associated with a medium access control command element (MAC-CE).

8. The method of claim 7, wherein the MAC-CE corresponds to a sidelink buffer status report (BSR).

9. The method of claim 8, wherein the sidelink PRS indication is based on a logical channel group identifier (ID) of the BSR, a destination index of the BSR, a buffer size value of the BSR, a sidelink PRS indication field of the BSR, or any combination thereof.

10. The method of claim 8, wherein the BSR is configured to indicate one or more requested sidelink PRS parameters.

11. The method of claim 10, wherein the one or more requested sidelink PRS parameters comprise a PRS duration, a PRS resource period, or any combination thereof.

12. The method of claim 1, wherein the first sidelink PRS is transmitted in association with a control signal.

13. A method of operating a wireless network component, comprising:
- receiving, from a user equipment (UE), a sidelink positioning reference signal (PRS) indication that comprises a requested sidelink PRS bandwidth amount; and
- transmitting, to the UE in response to the sidelink PRS indication, a resource grant associated with communication of at least a first sidelink PRS for transmission by the UE for a sidelink position estimation procedure.

14. The method of claim 13, wherein the requested sidelink PRS bandwidth amount corresponds to a requested number of physical resource blocks (PRBs) or a requested number of subchannels.

15. The method of claim 13, wherein the resource grant is associated with a downlink control information (DCI) format that is specific to sidelink PRS scheduling.

16. The method of claim 13, wherein the sidelink PRS indication is associated with a scheduling request (SR).

17. The method of claim 16,
- wherein the sidelink PRS indication is based on information included in the SR, or
- wherein the sidelink PRS indication is based on a physical uplink control channel (PUCCH) format associated with the SR, or
- a combination thereof.

18. The method of claim 13,
- wherein the first sidelink PRS is for transmission as a standalone sidelink PRS, or
- wherein the first sidelink PRS is for transmission in association with a control signal, or
- wherein the resource grant is associated with communication of the first sidelink PRS only, or
- wherein the resource grant is further associated with communication of a second sidelink PRS for transmission by another UE, or
- any combination thereof.

19. The method of claim 18,
- wherein the sidelink PRS indication includes reference to the another UE, or
- wherein the sidelink PRS indication does not include reference to the another UE.

20. The method of claim 13, wherein the sidelink PRS indication is associated with a medium access control command element (MAC-CE).

21. The method of claim 20, wherein the MAC-CE corresponds to a sidelink buffer status report (BSR).

22. The method of claim 21,
- wherein the sidelink PRS indication is based on a logical channel group identifier (ID) of the BSR, a destination index of the BSR, a buffer size value of the BSR, a sidelink PRS indication field of the BSR, or any combination thereof, or
- wherein the BSR is configured to indicate one or more requested sidelink PRS parameters, or
- wherein the one or more requested sidelink PRS parameters comprise a PRS duration, a PRS resource period or any combination thereof, or
- any combination thereof.

23. The method of claim 13, wherein the first sidelink PRS is transmitted in association with a control signal.

24. A user equipment (UE), comprising:
- one or more memories;
- one or more transceivers; and
- one or more processors communicatively coupled to the one or more memories and the one or more transceivers, the one or more processors, either alone or in combination, configured to:
  - transmit, via the one or more transceivers, to a wireless network component, a sidelink positioning reference signal (PRS) indication that comprises a requested sidelink PRS bandwidth amount;
  - receive, via the one or more transceivers,, from the wireless network component in response to the sidelink PRS indication, a resource grant associated with communication of at least a first sidelink PRS for a sidelink position estimation procedure; and
  - transmit, via the one or more transceivers, the first sidelink PRS in accordance with the resource grant.

25. The UE of claim 24, wherein the requested sidelink PRS bandwidth amount corresponds to a requested number of physical resource blocks (PRBs) or a requested number of subchannels.

26. The UE of claim 24, wherein the resource grant is associated with a downlink control information (DCI) format that is specific to sidelink PRS scheduling.

27. The UE of claim 24, wherein the sidelink PRS indication is associated with a scheduling request (SR).

28. The UE of claim 27,
- wherein the sidelink PRS indication is based on information included in the SR, or
- wherein the sidelink PRS indication is based on a physical uplink control channel (PUCCH) format associated with the SR, or
- a combination thereof.

29. The UE of claim 24,
- wherein the first sidelink PRS is transmitted as a standalone sidelink PRS, or
- wherein the first sidelink PRS is transmitted in association with a control signal, or
- wherein the resource grant is associated with communication of the first sidelink PRS only, or
- wherein the resource grant is further associated with communication of a second sidelink PRS for transmission by another UE, or
- wherein the sidelink PRS indication includes reference to the another UE, or wherein the sidelink PRS indication does not include reference to the another UE, or
- any combination thereof.

30. The UE of claim 24, wherein the sidelink PRS indication is associated with a medium access control command element (MAC-CE).

31. The UE of claim 30, wherein the MAC-CE corresponds to a sidelink buffer status report (BSR).

32. The UE of claim 31, wherein the sidelink PRS indication is based on a logical channel group identifier (ID) of the BSR, a destination index of the BSR, a buffer size value of the BSR, a sidelink PRS indication field of the BSR, or any combination thereof.

33. The UE of claim 31, wherein the BSR is configured to indicate one or more requested sidelink PRS parameters.

34. The UE of claim 33, wherein the one or more requested sidelink PRS parameters comprise a PRS duration, a PRS resource period, or any combination thereof.

35. The UE of claim 24, wherein the first sidelink PRS is transmitted in association with a control signal.

36. A wireless network component, comprising:
- one or more memories;
- one or more transceivers; and
- one or more processors communicatively coupled to the one or more memories and the one or more transceivers, the one or more processors, either alone or in combination, configured to:
  - receive, via the one or more transceivers,, from a user equipment (UE), a sidelink positioning reference signal (PRS) indication that comprises a requested sidelink PRS bandwidth amount; and transmit, via the one or more transceivers, to the UE in response to the sidelink PRS indication, a resource grant associated with communication of at least a first sidelink PRS for transmission by the UE for a sidelink position estimation procedure.

37. The wireless network component of claim 36, wherein the requested sidelink PRS bandwidth amount corresponds to a requested number of physical resource blocks (PRBs) or a requested number of subchannels.

38. The wireless network component of claim 36, wherein the resource grant is associated with a downlink control information (DCI) format that is specific to sidelink PRS scheduling.

39. The wireless network component of claim 36, wherein the sidelink PRS indication is associated with a scheduling request (SR).

40. The wireless network component of claim 39,
wherein the sidelink PRS indication is based on information included in the SR, or
wherein the sidelink PRS indication is based on a physical uplink control channel (PUCCH) format associated with the SR, or
a combination thereof.

41. The wireless network component of claim 36,
wherein the first sidelink PRS is for transmission as a standalone sidelink PRS, or
wherein the first sidelink PRS is for transmission in association with a control signal, or
wherein the resource grant is associated with communication of the first sidelink PRS only, or
wherein the resource grant is further associated with communication of a second sidelink PRS for transmission by another UE, or
any combination thereof.

42. The wireless network component of claim 41,
wherein the sidelink PRS indication includes reference to the another UE, or
wherein the sidelink PRS indication does not include reference to the another UE.

43. The wireless network component of claim 36, wherein the sidelink PRS indication is associated with a medium access control command element (MAC-CE).

44. The wireless network component of claim 43, wherein the MAC-CE corresponds to a sidelink buffer status report (BSR).

45. The wireless network component of claim 44,
wherein the sidelink PRS indication is based on a logical channel group identifier (ID) of the BSR, a destination index of the BSR, a buffer size value of the BSR, a sidelink PRS indication field of the BSR, or any combination thereof, or
wherein the BSR is configured to indicate one or more requested sidelink PRS parameters, or
wherein the one or more requested sidelink PRS parameters comprise a PRS duration, a PRS resource period or any combination thereof, or
any combination thereof.

46. The wireless network component of claim 36, wherein the first sidelink PRS is transmitted in association with a control signal.

* * * * *